(12) United States Patent
Sugitani

(10) Patent No.: US 9,267,530 B2
(45) Date of Patent: Feb. 23, 2016

(54) CAP STRUCTURE FOR PULLEY-FIXING NUT OF VEHICLE-USE ELECTRIC ROTATING MACHINE

(71) Applicant: DENSO CORPORATION, Kariya, Aichi-pref. (JP)

(72) Inventor: Katsuhiko Sugitani, Kariya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 13/897,729

(22) Filed: May 20, 2013

(65) Prior Publication Data

US 2014/0030042 A1  Jan. 30, 2014

(30) Foreign Application Priority Data

Jul. 25, 2012  (JP) .................................. 2012-164841

(51) Int. Cl.
*F16B 37/14* (2006.01)
(52) U.S. Cl.
CPC ...................................... *F16B 37/14* (2013.01)
(58) Field of Classification Search
CPC .................. F16B 37/14; F16B 41/005; B60B 2900/5112; B60B 2900/5114; B25B 23/08; B25B 23/10
USPC ............ 411/372.6, 372.5, 429, 431; 215/316, 215/317, 216, 224, 227; 81/125
See application file for complete search history.

(56) References Cited

U.S. PATENT DOCUMENTS

| | | | | |
|---|---|---|---|---|
| 4,659,273 A | * | 4/1987 | Dudley | 411/373 |
| 5,181,767 A | * | 1/1993 | Hudgins et al. | 301/37.375 |
| 5,302,069 A | * | 4/1994 | Toth et al. | 411/429 |
| 5,350,266 A | * | 9/1994 | Espey et al. | 411/431 |
| 5,810,532 A | * | 9/1998 | Huang | 411/431 |
| 5,857,818 A | * | 1/1999 | Bias, Sr. | 411/431 |
| 6,142,579 A | * | 11/2000 | Thiel | 301/37.374 |
| 6,328,158 B1 | * | 12/2001 | Bisbal et al. | 206/223 |
| 6,860,692 B2 | * | 3/2005 | Van Ingen et al. | 411/431 |

(Continued)

FOREIGN PATENT DOCUMENTS

| JP | A-57-172920 | 10/1982 |
|---|---|---|
| JP | U-5-79027 | 10/1993 |
| JP | A-11-172472 | 6/1999 |

(Continued)

OTHER PUBLICATIONS

Japanese Office Action issued in Japanese Application No. 2012-164841 mailed Apr. 11, 2014 (with partial translation).

(Continued)

*Primary Examiner* — Flemming Saether
(74) *Attorney, Agent, or Firm* — Oliff PLC

(57) ABSTRACT

The cap structure includes a nut engaged with a bolt end portion formed in an end of a rotating shaft of a vehicle-use electric rotating machine to fix a pulley. The nut has a polygonal outer periphery including a step portion projecting radially outward at an axial position closer to a seating surface of the nut than an axial center of the nut. The cap structure further includes a cap for covering the nut and the bolt end portion engaged with the nut and protruding from the nut. The cap is made of casting resin so as to have a polygonal inner periphery and an annular claw portion, the number of sides of the polygonal inner periphery being equal to a natural number-multiple of the number of sides of the outer periphery of the nut.

5 Claims, 4 Drawing Sheets

(56) References Cited

U.S. PATENT DOCUMENTS

2003/0202859 A1 10/2003 Van Ingen et al.
2004/0208723 A1* 10/2004 Stawarski .................... 411/349

FOREIGN PATENT DOCUMENTS

| JP | A-2002-112493 | 4/2002 |
| KR | 20-0383524 | 5/2005 |
| KR | 10-2008-0057537 | 6/2008 |

OTHER PUBLICATIONS

Office Action issued in Korean Patent Application No. 10-2013-0050570 dated Jun. 24, 2014 (with translation).

* cited by examiner

CAP STRUCTURE FOR PULLEY-FIXING NUT OF VEHICLE-USE ELECTRIC ROTATING MACHINE

This application claims priority to Japanese Patent Application No. 2012-164841 filed on Jul. 25, 2012, the entire contents of which are hereby incorporated by reference.

BACKGROUND OF THE INVENTION

1. Field of the Invention

The present invention relates to a cap structure for a pulley-fixing nut of a vehicle-use electric rotating machine mounted on a vehicle such as a passenger car or a truck

2. Description of Related Art

Generally, a vehicle-use electric rotating machine, which is mounted on a vehicle to be driven through a belt or to drive various auxiliaries through a belt, includes a pulley for transmitting a driving force between the belt and the rotor of the vehicle-use electric rotating machine. The pulley is fixed to an end of the rotating shaft of the rotor by tightening a nut. It is preferable to rust-proof the end of the rotating shaft after the pulley is fixed using the nut to improve marketability of the vehicle. However, plating or antirust-coating the end of the rotating shaft after tightening the nut increases the manufacturing cost substantially.

It is known to put a cap on the end of the rotating shaft after tightening the nut so that the end of the rotating shaft becomes resistant to rust, or at least rust which has occurred on the end of the rotating shaft becomes invisible. For example, refer to Japanese Utility Model Application Laid-open No. S57-172920. This Application describes that a rust-preventing cap, which covers both the outer periphery of such a nut and the end of a bolt engaging with the nut, is fixed by fitting projections formed in the inner periphery of the cap to the thread portion of the bolt.

However, using the rust-preventing cap involves a problem that, in a case where the bolt end portion protruding from the nut is not sufficiently long, it is not possible to sufficiently fit the projections formed in the inner periphery of the cap to the thread portion of the bolt. In such a case, if a longer bolt is used so that the bolt end portion protruding from the nut is sufficiently long, it is possible to fix the rust-preventing cap. However, in this case, it becomes difficult to reduce the size of the vehicle-use electric rotating machine including the rust-preventing cap, and the size of the rust-preventing cap itself has to be increased.

In addition, since the rotating shaft of the vehicle-use electric rotating machine rotates at a high speed and accordingly the nut also rotates at the high speed, there is a concern that the rust-preventing cap may come off because of decrease of the fixing force between the projections of the rust-preventing cap and the thread portion of the bolt, which is caused by the centrifugal force, a force in the rotational direction caused by variation of the rotational speed, and environmental stress (high vibration and high temperature).

SUMMARY

An exemplary embodiment provides a cap structure for a pulley-fixing nut of a vehicle-use electric rotating machine having a pulley driven by a belt including:

a nut engaged with a bolt end portion formed in an end of a rotating shaft of the electric rotating machine to fix the pulley, the nut having a polygonal outer periphery including a step portion projecting radially outward at an axial position closer to a seating surface of the nut than an axial center of the nut; and a cap for covering the nut and the bolt end portion engaged with the nut and protruding from the nut, the cap being made of casting resin so as to have a polygonal inner periphery and an annular claw portion, the number of sides of the polygonal inner periphery being equal to a natural number-multiple of the number of sides of the outer periphery of the nut, an inner diameter of an axial end of the annular claw portion being smaller than an outer diameter of the step portion of the nut.

According to the exemplary embodiment, there is provided a cap structure for a pulley-fixing nut of a vehicle-use electric rotating machine having a pulley driven by a belt, in which a cap can be firmly attached to a nut engaged with a bolt formed in an end of the rotating shaft of the vehicle-use electric rotating machine, and accordingly can be prevented from coming off while the vehicle-use electric rotating machine is in operation, irrespective of the length of a part of the bolt protruding from the nut.

Other advantages and features of the invention will become apparent from the following description including the drawings and claims.

PREFERRED EMBODIMENTS OF THE INVENTION

Figure 1:
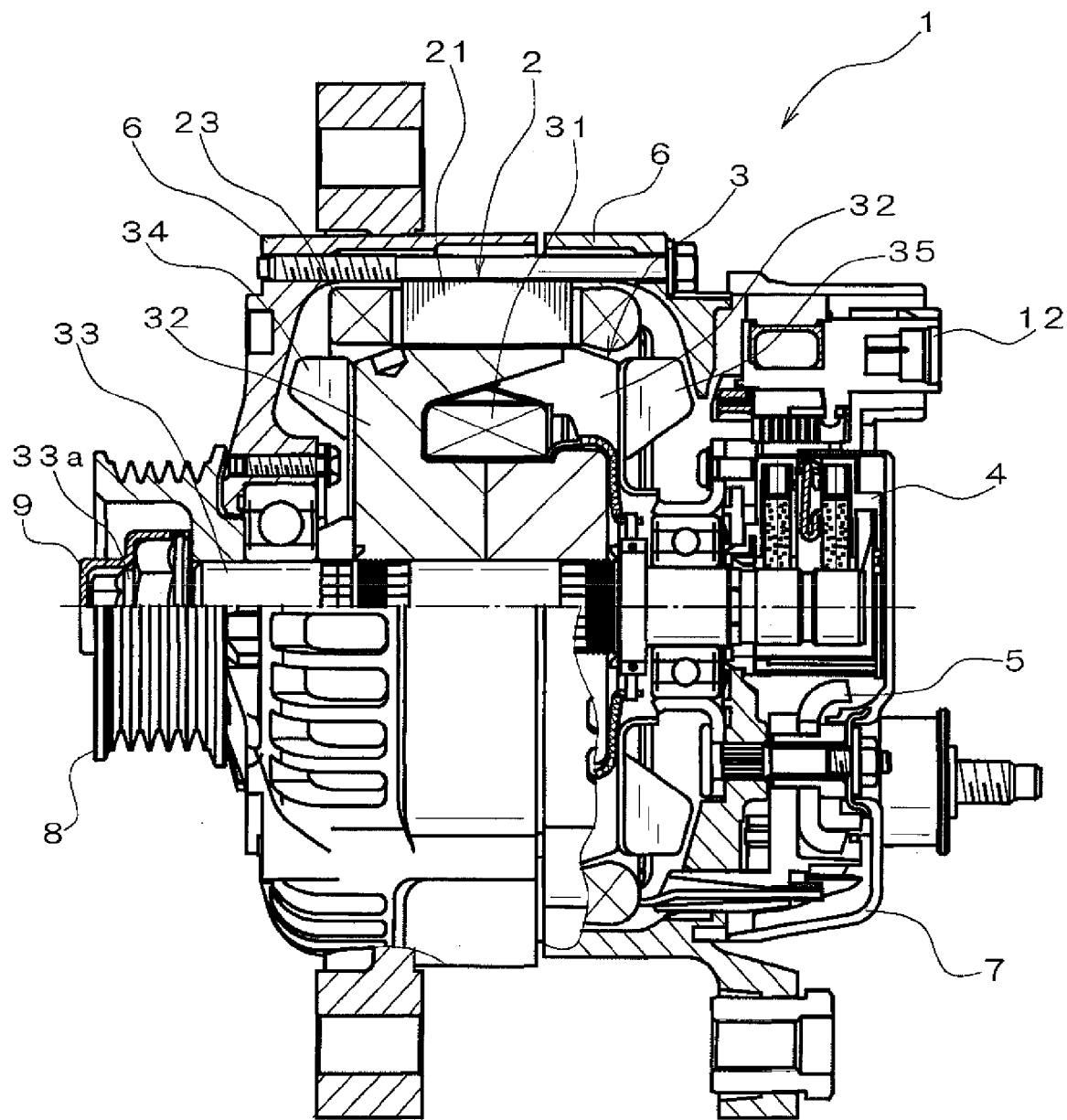
FIG. 1 is a cross-sectional view showing the entire structure of a vehicle-use alternator including a cap structure for a pulley-fixing nut according to an embodiment of the invention.
Figure 2:
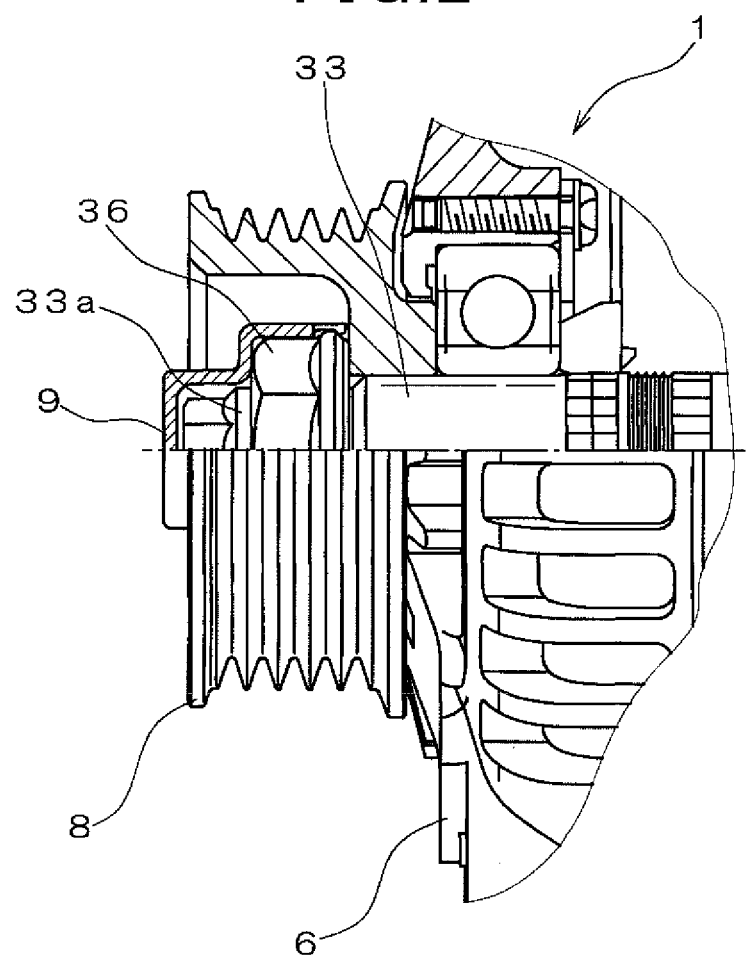
FIG. 2 is a partially enlarged view of the nut and cap included in the vehicle-use alternator.

A vehicle-use alternator 1 including a pulley-fixing nut cap structure according to an embodiment of the invention is described with reference to FIGS. 1 and 2. The alternator 1 includes a stator 2, a rotor 3, a brush device 4, a rectifier 5, a frame 6, a rear cover 7, a pulley 8 and a cap 9.

The stator 2 includes a stator core 21, a three-phase stator winding 23 wound around slots formed at even intervals in the stator core 21. The rotor 3 has a structure in which a field winding 31 formed by winding an insulated copper wire in a cylindrical and concentric shape is sandwiched by two pole cores 32 each having a plurality of magnetic claw portions fixed to a rotating shaft 33. The end surfaces of the pole cores 32 are fitted with cooling fans 34 and 35, respectively, by welding or the like.

The brush device 4 is provided for generating an excitation current to be supplied from the rectifier 5 to the field winding 31. The rectifier 5 rectifies a three-phase AC voltage outputted from the stator winding 23 to generate a DC voltage.

The frame 6 houses the stator 2 and the rotor 3 in such a state that the rotor 3 is rotatable around the rotating shaft 33, and the stator 2 is fixed outside the pole cores 32 of the rotor with a gap therebetween. The rear cover 7 is for covering and protecting the brush device 4, the rectifier 5 and an IC regulator 12 which are disposed outside the frame 6.

The pulley 8 is coupled to an engine (not shown) through a belt to receive a driving force from the engine. The pulley 8 is fixed to the front end portion of the rotating shaft 33 of the rotor 3 by tightening a nut 36 on a bolt end portion 33a in this front end portion as a male thread formed. The cap 9, which is made of casting resin, covers the nut 36 fixing the pulley 8, and a part of the bolt end portion 33a protruding from the nut 36. The cap 9 is provided for preventing foreign matter from adhering to the nut 36 or the bolt end portion 33a, and trapping rust which has occurred in these portions. The cap 9 is devised so as not to come off after being fitted.

The vehicle-use alternator 1 is configured such that the rotor 3 rotates in a predetermined direction when a rotational force is transmitted from the engine to the pulley 8 through the belt. By applying an excitation voltage to the field winding 31 of the rotor 3 to excite the claw portions of the pole cores 32, a three-phase AC voltage is induced in the stator winding 23, and a DC power is outputted from the output terminal of the rectifier 5.

Figure 3:
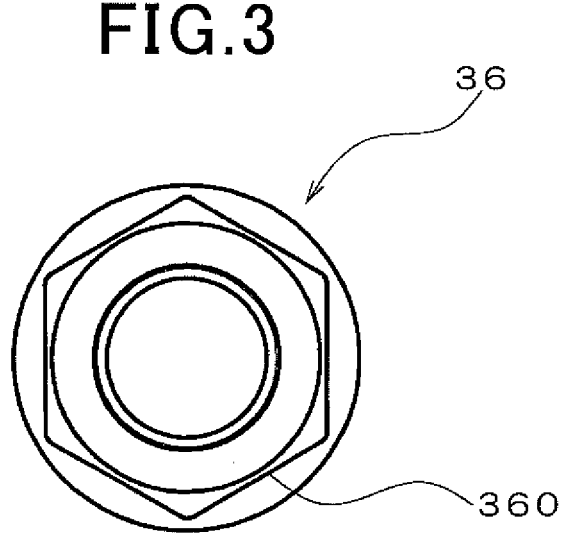
FIG. 3 is a plan view of the nut.
Figure 4:
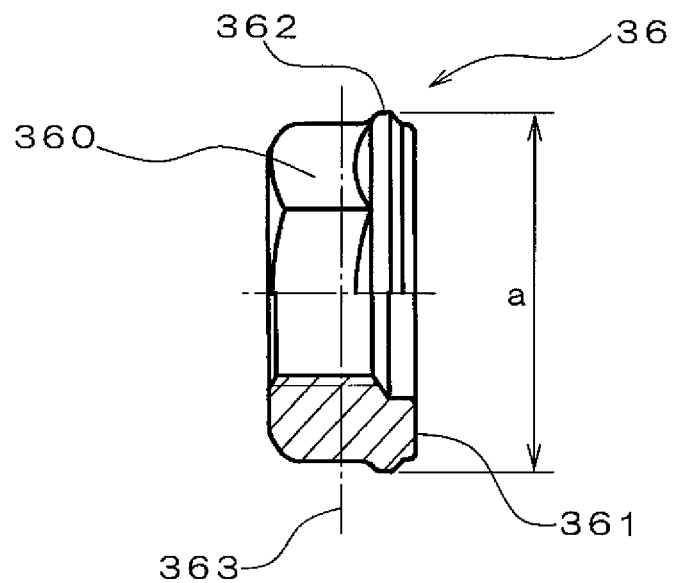
FIG. 4 is a side view of the nut.

Next, the nut 36 and the cap 9 are explained in detail. As shown in FIGS. 3 and 4, the nut 36 includes an outer periphery 360 of a polygonal shape (a hexagonal shape in this embodiment) and a seating surface 361. The outer periphery 360 includes a step portion 362 radially projecting at a seating surface-side position. Here, the term "seating surface-side position" means a position between the axial center position 363 (see FIG. 4) of the nut 36 and the seating surface 361. It is preferable that the step portion 362 is closer to the seating surface 361 than the axial center position 363. The step portion 362 has a circular ring shape with no discontinuity or unevenness in the circumferential direction. The diameter of the end portion at the side of the seating surface 361 of the outer periphery 360 is smaller than the outer diameter (see FIG. 4) of the step portion 362. The shape of this end portion may be the same polygonal shape as the outer periphery 360. Alternatively, this end portion may be formed in a shape of a cylinder shape whose diameter is smaller than that of the step portion 362.

Figure 5:
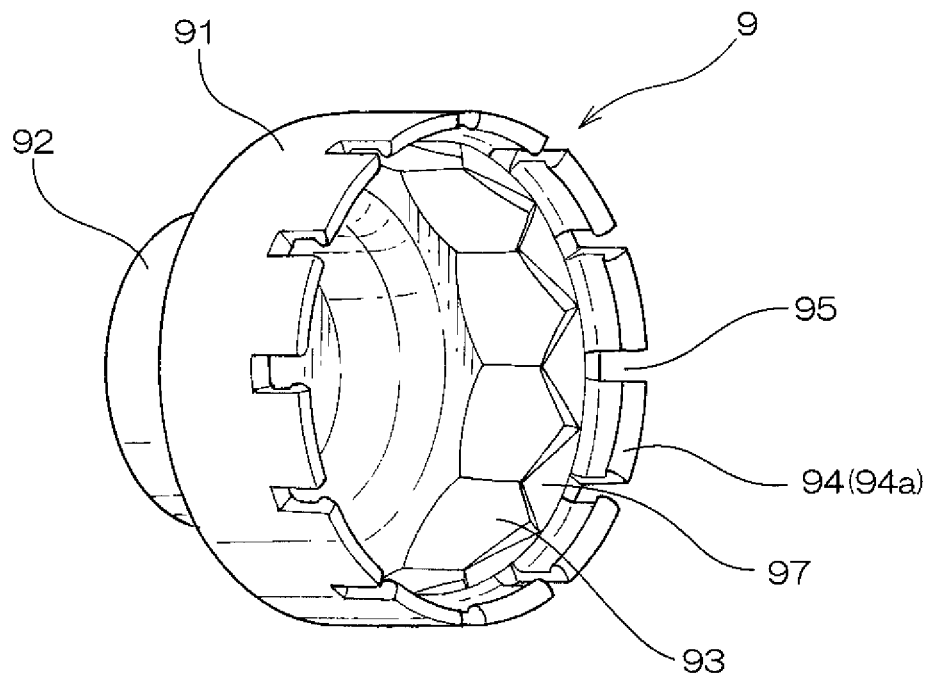
FIG. 5 is a perspective view of the cap.
Figure 6:
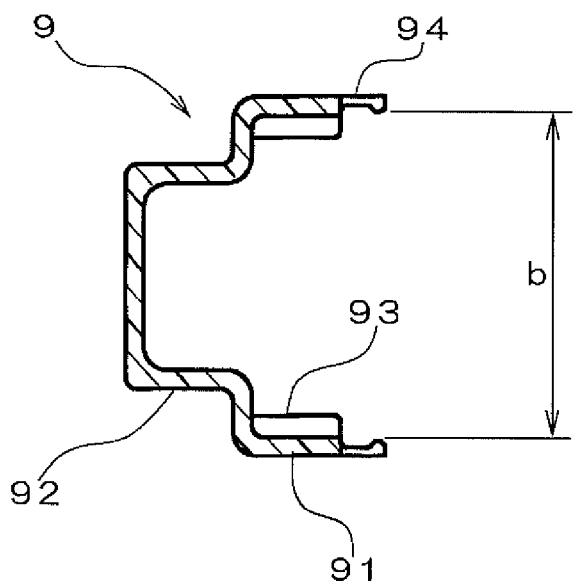
FIG. 6 is a cross-sectional view of the cap.
Figure 7:
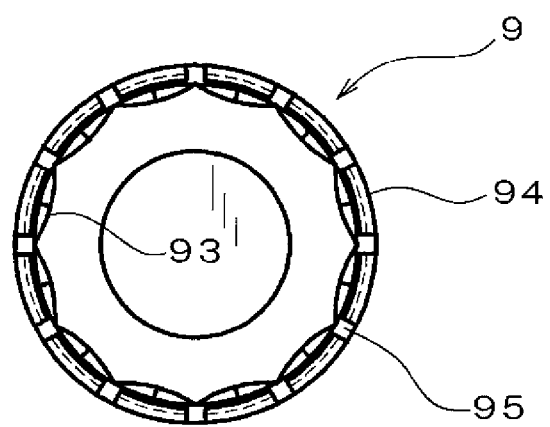
FIG. 7 is a plan view of the cap.

As shown in FIGS. 5 to 7, the outer periphery of the cap 9 is formed in a stepped shape including a first cylindrical portion 91 and a second cylindrical portion 92. The first cylindrical portion 91 corresponds to the outer periphery 360 of the nut 36. The second cylindrical portion 92 corresponds to the bolt end portion 33a protruding from the nut 36.

The cap 9 includes a polygonal inner periphery 93 the number of whose sides is equal to a natural number-multiple of the number of the sides (six in this embodiment) of the outer periphery 360 of the nut 36, and an annular claw portion 94 having an inner diameter of b (see FIG. 6) smaller than the outer diameter of a of the step portion 362 of the nut 36. In this embodiment, the number of the sides of the polygonal inner periphery 93 is equal to 12 (twice the number of the sides of the outer periphery 360 of the nut 36). The polygonal inner periphery 93 and the claw portion 94 are formed corresponding to the first cylindrical portion 91.

The claw portion 94 is circumferentially divided into a plurality of split claw portions 94a. Each of the split claw portions 94a is formed with a slit 95 extending from the opening of the first cylindrical portion 91 in the direction parallel to the center axis of the cylindrical portion 91. Since the distal end of each split claw portion 94a projects radially inward, the thickness of each split claw portion 94a is thinner at its proximal end and thicker at its distal end. The thinner proximal ends of the split claw portions 94a correspond to the step portion 362 of the nut 36 when the cap 9 is fitted to the nut 36. The thicker distal ends of the split claw portions 94a correspond to the end of the outer periphery 360 of the nut 36 at the side of the seating surface 361 when the cap 9 is fitted to the nut 36.

Figure 8A:
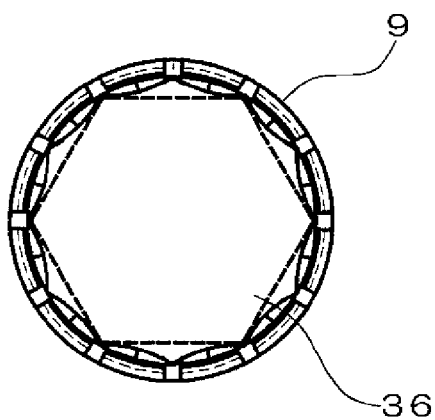
FIGS. 8A and 8B are diagrams explaining engagement between the cap and nut.
Figure 8B:
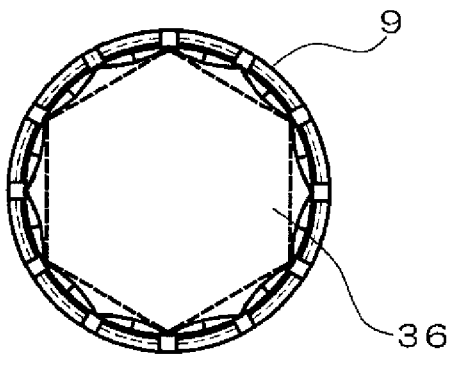

As shown in FIG. 5, there is provided a guide portion 97 at the boundary between each adjacent two of the sides of the polygonal inner periphery 93. The guide portion 97 is formed by making a dent in the adjacent two sides, which has a shape of a triangular sidewall which widens toward the end of the cap 9. In this embodiment, since the number of the sides of the polygonal inner periphery 93 is 12, the number of the guide portions 97 is 12. Here, as shown in FIGS. 8A and 8B, since the number of the sides of the outer periphery 360 of the nut 36 is 6, it is possible that the polygonal inner periphery 93 of the cap 9 contacts the outer periphery 360 of the nut 36 at either one of two groups of six 60-degree spaced points which are shifted by 30 degrees from each other in the circumferential direction. Accordingly, the cap 9 can be positioned in place by turning the cap by 30 degrees at most. Further, positioning operation of the cap can be done automatically by the provision of the guide portions 97.

According to the vehicle-use alternator described above, since the nut 36 for fixing the pulley 8 is formed with the step portion 362, and the cap 9 is retained by engagement between the claw portion 94 thereof and the step portion 362 of the nut 36, the cap 9 can be reliably fixed irrespective of the length of the bolt end portion 33a protruding from the nut 36. Since the inner periphery 93 of the cap 9 is formed in the polygonal shape, the cap 9 can be prevented from turning relative to the nut 36. Since the cap 9 is fixed by engagement between the claw portion 94 thereof and the step portion 362 of the nut 36, the cap 9 can be prevented from coming off the nut 36 irrespective of its circumferential position.

There is provided the guide portion 97 at the boundary between each adjacent two of the sides of the polygonal inner periphery 93, the guide portion 97 being formed by making a dent in the adjacent two sides so as to have a triangular sidewall which widens toward the end of the cap 9. Accordingly, since the cap 9 can be positioned in place at the time of fitting the cap 9 to the nut 36 without concern of the circumferential position of the cap 9, it is possible to automate the procedure of fitting the cap 9 at a low cost.

The claw portion 94 is circumferentially divided into a plurality of the split claw portions 94a, the thickness of each split claw portion 94a is thinner at the proximal end thereof and thicker at its distal end thereof. Accordingly, the cap 9 can be fitted to the nut 36 with a small force because the claw portion 94 can be easily engaged to the step portion 362 of the nut 36 by slightly deforming the cap 9.

Since each of the outer peripheries 91 and 92 of the cap 9 is formed in a cylindrical shape, the wind noise generated when the cap 9 rotates at a high speed together with the pulley 8 can be substantially reduced. More specifically, the outer periphery of the cap 9 is formed in the stepped shape including the first cylindrical portion 91 corresponding to the outer periphery 360 of the nut 36 and the second cylindrical portion 92 corresponding to the bolt end portion 33a protruding from the nut 36. This makes it possible to reduce the weight and material cost of the alternator 1 by reducing the amount of necessary resin material and also to improve the reliability of the alternator 1 because the centrifugal force generated when the cap 9 rotates together with the pulley 8 can be reduced.

It is a matter of course that various modifications can be made to the above described embodiment as described below. In the above embodiment, the number of the sides of the outer periphery 360 of the nut 36 is 6. However, it is possible to use a nut having an outer periphery the number of whose sides is other than 6. In the above embodiment, the number of the sides of the polygonal inner periphery 93 of the cap 9 is 12 (twice the number of the sides of the outer periphery 360 of the nut 36). However, it may be equal to the number of the sides of the outer periphery 360 multiplied by a natural number other than 2 (1 or 3, for example).

The above embodiment relates to the cap structure of a nut for fixing a pulley of a vehicle-use alternator. However, the present invention is applicable to a cap structure of a nut of an electric rotating machine used as other than a vehicle-use alternator.

The above explained preferred embodiments are exemplary of the invention of the present application which is described solely by the claims appended below. It should be understood that modifications of the preferred embodiments may be made as would occur to one of skill in the art.

What is claimed is:

1. A cap structure for a pulley-fixing nut of a vehicle-use electric rotating machine having a pulley driven by a belt, the cap structure comprising:

a nut configured to be engaged with a bolt end portion formed in an end of a rotating shaft of the electric rotating machine to fix the pulley, the nut having a polygonal outer periphery including a step portion projecting radially outward at an axial position closer to a seating surface of the nut than an axial center of the nut; and a cap for covering the nut and the bolt end portion protruding from the nut when the nut is engaged with the bolt, the cap being made of casting resin and having a polygonal inner periphery and an annular claw portion, a number of sides of the polygonal inner periphery being equal to a natural number-multiple of a number of sides of the outer periphery of the nut, an inner diameter of an axial end of the annular claw portion being smaller than an outer diameter of the step portion of the nut, wherein the cap includes a guide portion provided at a boundary between each adjacent two of the sides of the polygonal inner periphery, the guide portion being formed of a dent in each adjacent two of the sides of the polygonal inner periphery and having a shape of a triangular sidewall which widens toward the axial end of the annular claw portion.

2. The cap structure according to claim 1, wherein the annular claw portion is circumferentially divided into a plurality of split claw portions.

3. The cap structure according to claim 1, wherein a thickness of the annular claw portion is thinner at a proximal end of the annular claw portion compared to a distal end of the annular claw portion.

4. The cap structure according to claim 1, wherein the cap has a cylindrical outer periphery.

5. The cap structure according to claim 1, wherein the cap has an outer periphery including a first cylindrical portion corresponding to the outer periphery of the nut and a second cylindrical portion corresponding to a part of the bolt end portion protruding from the nut when the nut is engaged with the bolt.

* * * * *